United States Patent [19]

Nakagawa et al.

[11] Patent Number: 4,727,415

[45] Date of Patent: Feb. 23, 1988

[54] VARIABLE DIRECTION FILTER FOR SEPARATION OF LUMINANCE AND CHROMINANCE SIGNALS

[75] Inventors: Shinichi Nakagawa, Itami; Tokumichi Murakami, Kamakura, both of Japan

[73] Assignee: Mitsubishi Denki Kabushiki Kaisha, Tokyo, Japan

[21] Appl. No.: 783,536

[22] Filed: Oct. 3, 1985

[30] Foreign Application Priority Data

Oct. 5, 1984 [JP] Japan .................. 57-210010
Dec. 21, 1984 [JP] Japan .................. 57-271168

[51] Int. Cl.$^4$ ............................................ H04N 9/64
[52] U.S. Cl. .................................................... 358/31
[58] Field of Search ............... 358/31, 21 R, 314, 13

[56] References Cited

U.S. PATENT DOCUMENTS

| | | | |
|---|---|---|---|
| 4,050,084 | 9/1977 | Rossi | 358/31 |
| 4,141,035 | 2/1979 | Maxemchuk et al. | 358/31 |
| 4,352,122 | 9/1982 | Reitmeier et al. | 358/31 |
| 4,376,955 | 3/1983 | Reitmeier | 360/38.1 |
| 4,464,686 | 8/1984 | Reitmeier | 358/36 |
| 4,626,895 | 12/1986 | Reitmeier | 358/31 |

FOREIGN PATENT DOCUMENTS 129891 8/1983 Japan .

OTHER PUBLICATIONS

"Digital TV Comb Filter with Adaptive Features", John P. Rossi, IERE Conf. Proc., pp. 267–282, (1976).

*Primary Examiner*—James J. Groody
*Assistant Examiner*—Robert M. Bauer
*Attorney, Agent, or Firm*—Lowe, Price, LeBlanc, Becker & Shur

[57] ABSTRACT

Signal generating means formed by variable line delay circuits 6 and 9 and dot delay circuits 7 and 8 receives a series of signal sample of a composite color television signal sampled in synchronism with a chrominance subcarrier at a frequency four times the chrominance subcarrier frequency and generates simultaneously a sample signal at a specified sampled point for separating a luminance signal and a chrominance signal and sampled signals at four sample points adjacent to the specified sample point, namely, four sampled points on the upper, lower, right and left sides of the specified sample point. A comparing and determining circuit 10 compares and determines a direction in which there is little change in the picture, based on the sampled signals at the adjacent sample points. Based on the result of determination of the comparing and determining circuit 10, a selector 11 selects and provides two sampled signals 110 and 111 existing in a region where there is little change in the picture. A separation filter 12 separates a chrominance signal 105 from the sampled signal 102 at the specified sample point using the two sampled signals 110 and 111 provided from the selector 11. A subtractor 5 subtracts the chrominance signal 105 from the sampled signal 102 at the specified sample point so as to provide a luminance signal 106.

11 Claims, 9 Drawing Figures

VARIABLE DIRECTION FILTER FOR SEPARATION OF LUMINANCE AND CHROMINANCE SIGNALS

BACKGROUND OF THE INVENTION

1. Field of the Invention

The present invention relates to a luminance signal and chrominance signal separation filter and particularly relates to a filter for separating a luminance signal and a chrominance singal from a composite color television signal of a standard system.

2. Description of the Prior Art

In a current standard television system, luminance information and chrominance information are transmitted as a composite signal having multiplexed frequencies and accordingly, it is necessary for the receiver to separate the information thus transmitted into a luminance signal and a chrominance signal correctly.

A composite color television signal S of the NTSC system is a composite signal including a luminance signal Y and a chrominance signal C which is obtained by applying two-phase modulation to two color-difference signals U and V (or I and Q) at a chrominance subcarrier frequency $f_{sc}$, as shown in the following equation (1).

$$S = Y + C = Y + U\sin(2\pi f_{sc}t) + V\cos(2\pi f_{sc}t) \quad (1)$$

Assuming that the frame frequency $f_F$ is 30 Hz, the field frequency $f_V$ is 60 Hz and the horizontal scanning frequency $f_H$ is 15.75 KHz, these frequencies and the chrominance subcarrier frequency $f_{sc}$ have a relation as shown in the following equation (2).

$$f_{sc} = \frac{455}{2} f_H = \frac{455}{2} \cdot \frac{525}{2} f_V = \frac{455}{2} \cdot 525 f_F \quad (2)$$

As a result, if a composite color television signal of the NTSC system is synchronized and sampled at a sampling frequency $f_S$ which is four times greater than the chrominance subcarrier frequency $f_{sc}$, the series of signal samples is arranged two-dimensionally on the screen as shown in FIG. 6. More specifically, four samples are taken for each cycle of the chrominance subcarrier with the phase of the chrominance signal C being inverted by 180° for each line. In FIG. 6, the triangular and quadrangular symbols represent sample points; Y represents a luminance signal; C and C' represent respectively chrominance signals; and U and V represent respectively color-diffrerence signals.

On the other hand, a composite color television signal P of the PAL system is represented by the following equation (3):

$$P = Y + U\sin(2\pi f'_{sc}t) \pm V\cos(2\pi f'_{sc}t) \quad (3)$$

where $f'_{sc}$ represents a chrominance subcarrier frequency. In this equation (3), the plus and minus signs are selected alternately in a manner in which the plus sign + is selected on each even-numbered scanning line and the minus sign − is selected on each odd-numbered scanning line. In other words, the component V is inverted for each scanning line.

Assuming that the frame frequency $f'_F$ is 25 Hz, the field frequency $f'_V$ is 50 Hz and the horizontal scanning frequency $f_H$ is 15.625 KHz, these frequencies and the chrominance subcarrier frequency $f'_{sc}$ have a relation as indicated in the following equation (4).

$$f'_{sc} = \left(284 - \frac{1}{4} + \frac{1}{625}\right) f_H = \left(284 - \frac{1}{4} + \frac{1}{625}\right) \quad (4)$$

$$\frac{625}{2} f_V = \left(284 - \frac{1}{4} + \frac{1}{625}\right) \cdot 625 f_F$$

More specifically, the chrominance subcarrier frequency $f'_{sc}$ and the horizontal scanning frequency $f_H$ are in a ¼ line offset relation. As a result, the series of signal sample obtained by synchronizing and sampling the composite color television signal of the PAL system at a sampling frequency $f'_s$ which is four times the chrominance subcarrier frequency $f'_{sc}$, is arranged two-dimensionally on the screen as shown in FIG. 7. More specifically, the phase of the chrominance signal becomes the same repeatedly in a four line cycle. In FIG. 7, the triangular and quadrangular symbols and the reference characters Y, C, C', U and V have the same meanings as in FIG. 6.

Generally, in order that a composite color television signal may have compatibility with a monochromatic television signal, the frequency of a chrominance signal of the composite color television signal is multiplexed in a manner in which the spectrum is frequency interleaved within the bandwidth of a luminance signal of the composite color television signal. Consequently, a television receiver needs to have a YC separation filter for correctly separating the luminance signal Y and the chrominance signal C.

An example of a conventional luminance signal and chrominance signal separation filter of this kind is shown in FIG. 1. Referring to FIG. 1, a series of signal sample 101 of a composite color television signal, which is sampled in synchronism with a chrominance subcarrier at a sampling frequency, is applied to a one-line delay circuit 1. The one-line delay circuit 1 delays the series of sampled signal 101 by one line and provides a one-line delayed signal 102. The one-line delayed signal 102 is supplied to another one-line delay circuit 2, which delays the one-line delayed signal 102 by one line and provides a two-line delayed signal 103. A vertical filter 3 receives the series of signal sample 101, the one-line delayed signal 102 and the two-line delayed signal 103. The vertical filter 3 provides a line alternating signal 104 alternating for each line including a chrominance signal. The line alternating signal 104 is applied to a bandpass filter 4. The bandpass filter 4 separates the chrominance signal as a high frequency component from the line alternating signal 104 and provides the chrominance signal 105. The one-line delayed signal 102 and the chrominance signal 105 are supplied to a subtractor 5. The subtractor 5 separates the chrominance signal 105 from the one-line delayed signal 102 so as to separate and provide a luminance signal 106.

Now, the operation of the luminance signal and chrominance signal separation filter thus structured will be described. First, the operation in case of applying a series of signal sample of a composite color television signal of the NTSC system will be described.

In this case, the series of signal sample 101 of the NTSC composite color television signal sampled in synchronism with the chrominance subcarrier at a sampling frequency $f_s = 4 \cdot f_{sc}$ is display on the screen at positions which are arranged on the screen in a two dimensional lattice as shown in FIG. 6. A delay of one sample and a delay of one line are represented respectively by the characters $Z^{-1}$ and $Z^{-l}$ using a Z-transform. With the conditions of $Z^{-1}=\exp\{-jz2\pi f/4f_{sc}\}$ and $f_{sc}=455/2f_H$, the value $l=910$ is obtained.

Now, let us assume that a signal sample S (m, n+1), at coordinates (m, n+1) selected out of the respective sample points shown in FIG. 6, is applied to the one-line delay circuit 1. In this case, the one-line delayed signal 102 from the one-line delay circuit 1 is a signal sample (m, n) and the two-line delayed signal 103 from the one-line delay circuit 2 is a signal sample S(m, n−1). These signal samples S(m, n+1), S(m, n) and S(m, n−1) are applied to the vertical filter 3. The vertical filter 3 extracts the line alternating signal including the chrominance signal, alternating for each line. The transfer function $H_V(Z)$ of the vertical filter 3 is $H_V(Z)=-\frac{1}{4}(1-Z^{-l})^2$. More specifically stated, the vertical filter 3 extracts the line alternating signal 104 at the coordinates (m, n) on the screen shown in FIG. 6, as $H_c(m, n)$ represented by the below indicated equation (5), regarding the television signals as being similar in the adjacent picture elements.

$$H_c(m, n) = -\tfrac{1}{4}\{S(m, n-1) - 2S(m, n) + S(m, n+1)\} \quad (5)$$

Since this line alternating signal $H_c(m, n)$ includes also a luminance signal, a chrominance signal C(m, n) is separated from the line alternating signal $H_c(m, n)$ as a high-frequency component by a horizontal bandpass filter 4. The transfer function $H_h(Z)$ of the horizontal bandpass filter 4 is, for example, $H_h(Z) = -1/32(1-Z^{-2})(1+Z^{-4})(1+Z^{-8})$.

On the other hand, the subtractor 5 receives the one-line delayed signal S(m, n) from the one-line delay circuit 1 and the chrominance signal C(m, n) from the horizontal bandpass filter 4, so that the luminance signal 106 is provided as Y(m, n) represented by the following equation (6):

$$Y(m, n) = S(m, n) - C(m, n) \quad (6)$$

Now, the operation in case of applying a series of signal samples of a composite color television signal of the PAL system will be described in the following.

In this case, the series of signal sample 101 of a PAL composite color television signal sampled in synchronism with a chrominance subcarrier at a sampling frequency $f'_s = 4f_{sc}$ is arranged on the screen with the phase of the chrominance signal being changed as shown in FIG. 7. More specifically, the phase of the chrominance signal repeats with a period of four lines and as for the even-numbered lines, the chrominance signal component with the phase of the chrominance subcarrier changing by 180° corresponds to the preceding line and as for the odd-numbered lines, the chrominance signal component with the phase changing by 180° corresponds to the succeeding line. Therefore, in order to obtain a PAL four-line alternating signal $H'_C$ corresponding to the NTSC line alternating signal 104 by signal processing in the vertical filter 3, calculating operations are changed alternately for each odd-numbered line and each even-numbered line. The line alternating signals $H'_c(m, 2n-1)$ and $H'_c(m, 2n)$ in this case are represented by the following equations (7) and (8).

Odd-numbered line: $H'_c(m, 2n-1) = \tfrac{1}{2}\{P(m, 2n-1) - P(m, 2n)\}$ (7)

Even-numbered line: $H'_c(m, 2n) = \tfrac{1}{2}\{P(m, 2n) - P(m, 2n-1)\}$ (8)

More specifically, using the corresponding upper and lower sample points for every two lines, the line alternating signal 104 is extracted. The line alternating signal 104 thus obtained is supplied to the horizontal bandpass filter 4, so that the chrominance signal 105, that is, C(m, n) is obtained. The chrominance signal 105 is supplied to the subtractor 5 so that the luminance signal Y(m, n) 106 is separated from the one-line delayed signal 102.

Thus, a conventional luminance signal and chrominance signal separation filter is structured by combination of a fixed vertical filter and a fixed horizontal filter and such a conventional separation filter is based on the assumption that picture elements in the series of signal sample of a television signal are similar when the picture elements are adjacent to each other on the screen. Accordingly, such a conventional type of filter has disadvantages that in a region where there are considerable changes in the luminance and the chrominance of the picture, the luminance signal and the chrominance signal are liable to leak to the adjacent channel, causing disturbances in the reproduced picture such as a hue disturbance by a cross color phenomenon or a dot disturbance.

Therefore, an object of the present invention is to provide a dynamic luminance signal and chrominance signal separation filter in which hue disturbances caused by a cross color phenomenon or dot disturbances hardly occur, even in a region where there are considerable changes in the luminance and the chrominance of the picture and thus, disturbance in the reproduced picture can be decreased to a minimum.

Briefly stated, the present invention is a luminance signal and chrominance signal separation filter which operates in the following manner. A series of signal sample of a composite color television signal sampled in synchronism with a chrominance subcarrier at a frequency which is four times the frequency of the chrominance subcarrier is applied and further signal samples are generated at a specified sampled point for separating a luminance signal and a chrominance signal from the series of signal samples and at four or more sample points adjacent thereto on the screen. Based on these signals, a direction is determined in which there is little change in the picture. Based on the determination, two signal samples belonging to a region in which there is little change in the picture are selected and, using these selected signals, the luminance signal and the chrominance signal are separated from the signal samples at the specified sampled point.

According to the present invention, at the time of separating a luminance signal and a chrominance signal at a specified sample point, a direction in which there is little change in the waveform of a composite color television signal is detected using the values of the sample points adjacent to the specified sample point and a luminance signal and a chrominance singal are separated using the sample points positioned in the direction thus detected. Consequently, even in a region where there are considerable changes in the luminance and the chrominance of the picture, a color picture of good quality without cross color or dot disturbance can be reproduced.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows a relation between the respective sampled signals and the respective sampled points shown in FIG. 8.

DESCRIPTION OF THE PREFERRED EMBODIMENTS

Figure 1:
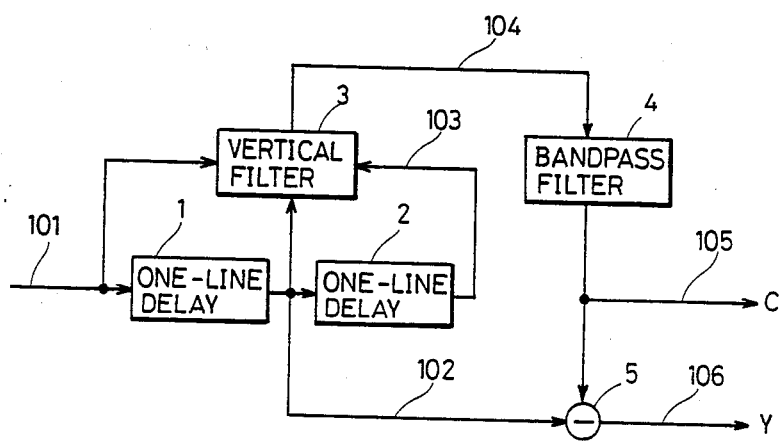
FIG. 1 is a schematic block diagram showing an example of a conventional luminance signal and chrominance signal separation filter.
Figure 2:
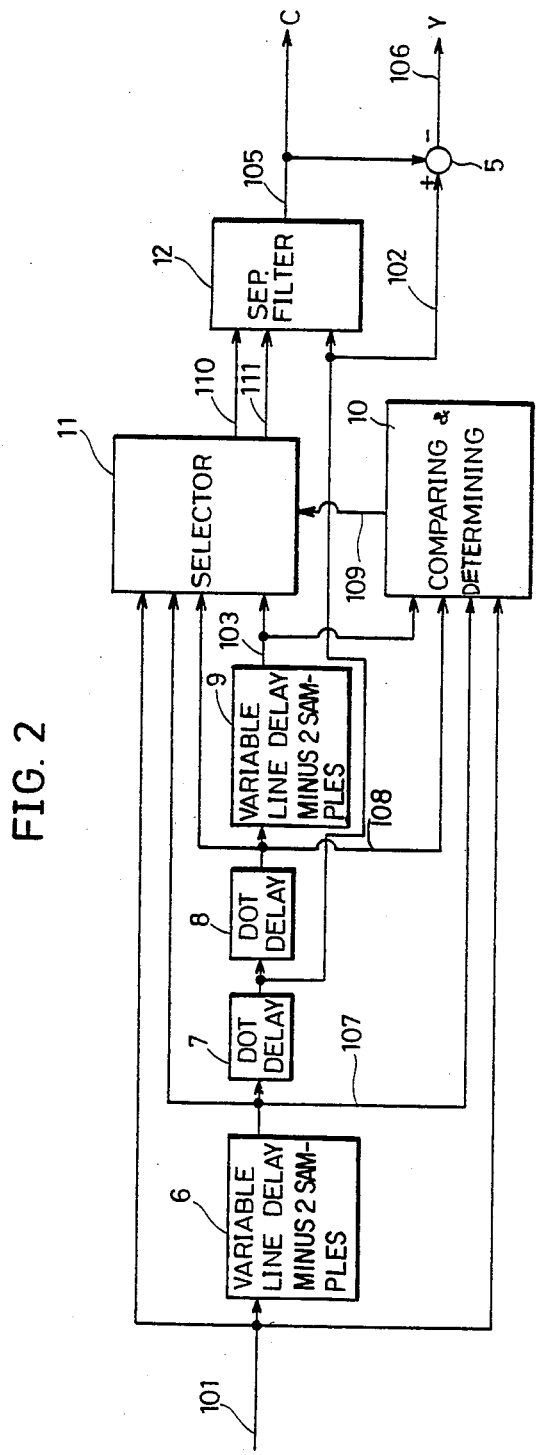
FIG. 2 is a schematic block diagram showing an embodiment of the present invention.

FIG. 2 is a schematic block diagram showing an embodiment of the present invention. Referring to FIG. 2, a series of signal sample 101 of a composite color television signal of the NTSC or PAL system sampled in synchronism with the chrominance subcarrier at a predetermined sampling frequency is supplied to a first variable line delay circuit 6. Though not shown, the apparatus of this embodiment comprises a pulse generating circuit for generating sampling pulses at a frequency four times as great as the frequency of the chrominance subcarrier and an analog-to-digital converter for converting the entered analog composite color television signal to a digital signal using the above stated sampling pulses, so that the output of the analog-to-digital converter is supplied to the first variable line delay circuit 6. The first variable line delay circuit 6 is structured so that the delay time is changed according to whether the NTSC system or the PAL system, respectively, is adopted for the applied series of signal sample 101. More specifically, the first variable line delay circuit 6 delays the series of signal sample 101 by a period of time corresponding to one line minus two samples in the case of the NTSC system and it delays the applied signal sequence 101 by a period of time corresponding to two lines minus two samples in the case of the PAL system. The first variable line delay circuit 6 is formed by a shift register, for example. In this case, the number of clock pulses generated till the data entered through the input terminal of the first variable line delay circuit 6 is provided to the output terminal thereof is 908 in the NTSC system and 2268 in the PAL system. Accordingly, the first variable line delay circuit 6 is adapted to select either of the above two numbers of clock pulses.

The output 107 of the first variable line delay circuit 6 is supplied to a first dot delay circuit 7. The first dot delay circuit 7 delays the output 107 of the first variable line delay circuit 6 by two samples. This first dot delay circuit 7 is formed by a shift register, for example. In this case, the number of clock pulses generated till the data entered through the input terminal of the first dot delay circuit 7 is provided to the output terminal thereof is 2. The output 102 of the first dot delay circuit 7 is supplied to a second dot delay circuit 8. The second dot delay circuit 8 delays the output 102 of the first dot delay circuit 7 by two samples. The second dot delay circuit 8 is formed in the same manner as in the above stated first dot delay circuit 7. The output 108 of the second dot delay circuit 8 is supplied to a second variable line delay circuit 9. The second variable line delay circuit 9 has the same structure as in the above stated first variable line delay circuit 6. The second variable line delay circuit 9 delays the output 108 of the second dot delay circuit 8 by a period of time corresponding to one line minus two samples in the case of the NTSC system and delays the output 108 by a period of time corresponding to two line minus two samples in the case of the PAL system.

The variable line delay circuits 6 and 9 and the dot delay circuits 7 and 8 constitute the further signal generating means. This further signal generating means provides simultaneously a sampled signal 102 at a specified sample point at which a luminance signal and a chrominance signal are to be separated and signal samples 103 and 101 at sample points vertically adjacent to the specified sampled point as well as sampled signals 108 and 107 at sample points horizontally adjacent to the specified sample point on the screen, the phase of the chrominance subcarrier of the respective sampled signals at the adjacent sampled points being different by 180° from that of the sampled signal 102.

For convenience sake, in the following description, the signal 102 provided from the first dot delay circuit 7 is referred to as a display signal; the signal 108 provided from the second dot delay circuit 8 is referred to as a sample signal at the first sampled point; the signal 107 provided from the first variable line delay circuit 6 is referred to as a sampled signal at the second sample point; the signal 103 provided from the second variable line delay circuit 9 is referred to as a sampled signal at the third sample point; and the signal 101 applied to the first variable line delay circuit 6 is referred to as a sample signal at the fourth sampled point.

The sampled signal at the first sampled point provided from the second dot delay circuit 8, the sampled signal at the second sample point provided from the first variable line delay circuit 6, the sampled signal at the third sample point provided from the second variable line delay circuit 9 and the sampled signal at the fourth sample point, that is, the series of signal sample 101, are supplied to a comparing and determining circuit 10. The comparing and determining circuit 10 calculates absolute values of differences between these sampled signals at the first to fourth sample points and provides a selector control signal 109 according to the sampled signal which represents the smallest absolute value of difference. In this embodiment, an absolute value of the difference between the sampled signals at the first and third sampled point, an absolute value of difference between the sampled signals at the first and fourth sampled point, an absolute value of difference between the sampled signals at the second and third sampled points and an absolute value of difference between the sampled signals at the second and fourth sampled points are calculated by comparison.

Figure 3:
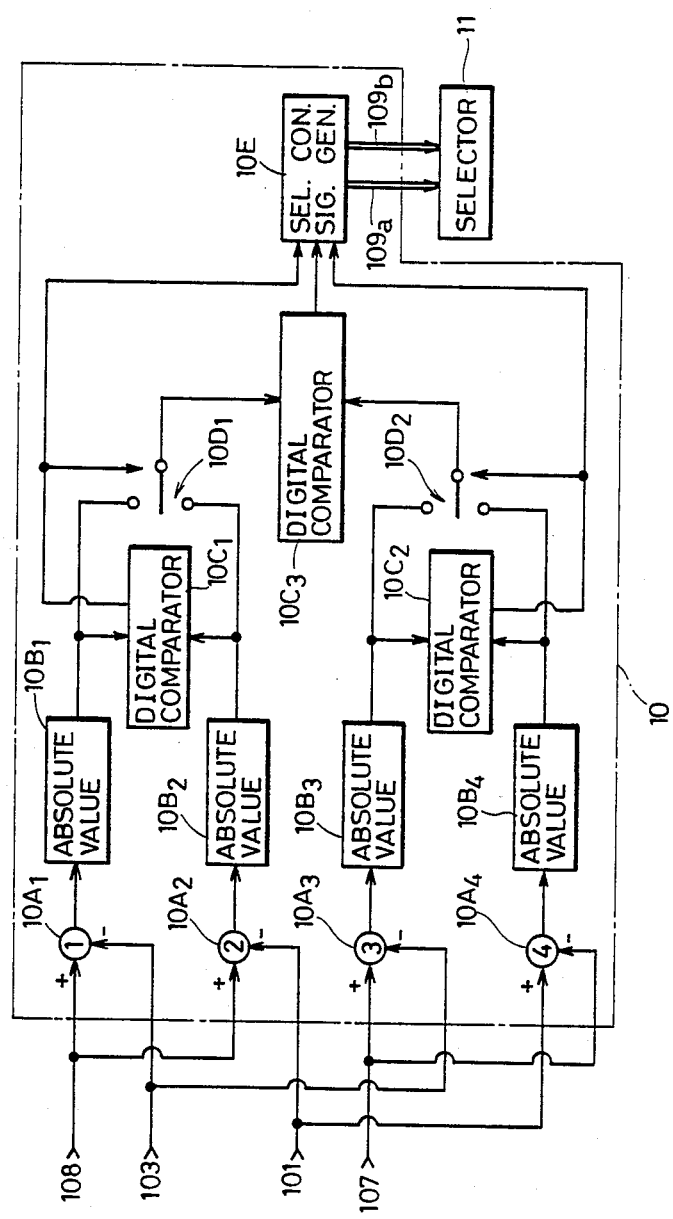
FIG. 3 is a block diagram showing a preferred example of a comparing and determining circuit shown in FIG. 2.

FIG. 3 is a block diagram showing a preferred example of the comparing and determining circuit 10. Referring to FIG. 3, the first subtractor $10A_1$ receives the sampled signal at the first sample point and the sampled signal at the third sample point and provides a difference signal between these signals. The second subtractor $10A_2$ receives the sample signal at the first sampled point and the sample signal at the fourth sampled point and provides a difference signal between these signals. The third subtractor $10A_3$ receives the sampled signal at the second sample point and the sampled signal at the third sampled point and provides a difference signal between these signals. The fourth subtractor $10A_4$ receives the sample signal at the second sampled point and the sampled signal at the fourth sample point and provides a difference signal between these signals. The first to fourth absolute value circuits $10B_1$ to $10B_4$ provide absolute values of these difference signals provided from the first to fourth subtractors respectively. The first digital comparator $10C_1$ receives the absolute value of difference signals from the first and second absolute value circuits $10B_1$ and $10B_2$ and compares these signals to provide a determination output signal according to the smaller absolute value of difference signal. The second digital comparator $10C_2$ receives the absolute value of difference signals from the third and fourth absolute value circuits $10B_3$ and $10B_4$ and compares these signals to provide a determination output signal according to the smaller absolute value of difference signal. The first switching means $10D_1$, selects and provides the absolute value of difference signal from the first absolute value circuit $10B_1$, or the absolute value of difference signal from the second absolute value circuit $10B_2$ based on the determination output signal from the first digital comparator $C_1$. The second switching means $10D_2$ selects and provides the absolute value of difference signal from the third absolute value circuit $10B_3$ or the absolute value of difference signal from the fourth absolute value circuit $10B_4$ based on the determination output signal from the second digital comparator $10C_1$. The third digital comparator $10C_3$ receives the absolute value of difference signals from the first and second switching means $10D_1$ and $10D_2$ and compares these signals to provide a determination output signal according to the smaller absolute value of difference signal. The selector control signal generating circuit 10E receives the determination output signals from the first to third digital comparators $10C_1$ to $10C_3$ and provides selector control signals 109a and 109b for selecting two sampled signals serving as the smallest absolute value of difference.

The selector 11 receives the sampled signal at the first sample point from the second dot delay circuit 8, the sample signal at the second sampled point from the first variable line delay circuit 6, the sampled signal at the third sample point from the second variable line delay circuit 9 and the sampled signal at the fourth sample point, that is, the series of sampled signal 101 so that two sampled signals are selected and provided from the above stated four sampled signals based on the selector control signal 109 from the comparing and determining circuit 10.

Figure 4:
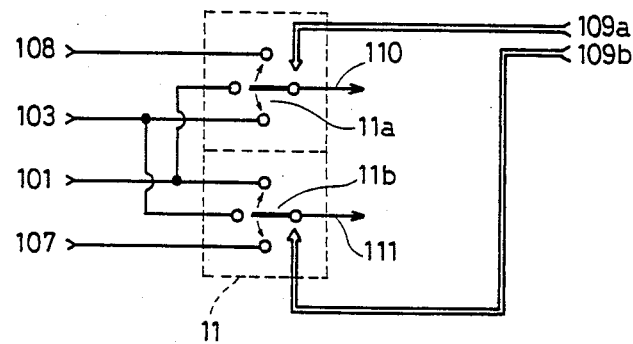
FIG. 4 is a block diagram showing a preferred example of a selector shown in FIG. 2.

FIG. 4 is a block diagram showing a preferred example of the above stated selector 11. Referring to FIG. 4, the first switching circuit 11a selects among the sampled signals at the first, third and fourth sample points connected to the respective input terminals and provides any one of these sampled signals as the first signal 110 based on the selector signal 109a from the selector control signal generating circuit 10E. The second switching circuit 11b selects among the sampled signals at the second, third, and fourth sample points connected to the respective input terminals and provides any one of these sampled signals as the second signal 111 based on the selector signal 109b from the selector control signal generating circuit 10E.

The separation filter 12 receives the first and second signals 110 and 111 from the selector 11 as well as the display signal from the first dot delay circuit 7 so that a chrominance signal 105 is provided.

Figure 5:
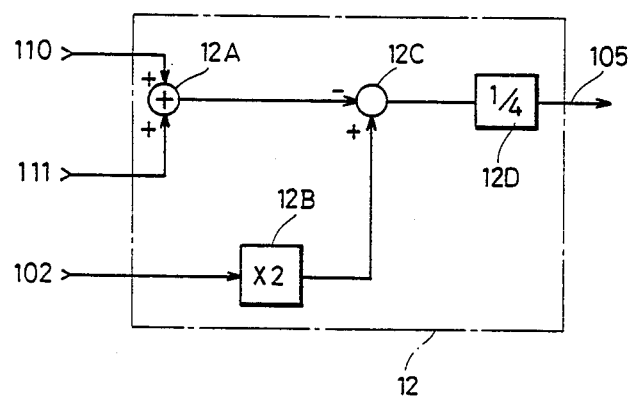
FIG. 5 is a block diagram showing a preferred example of a separation filter shown in FIG. 2.

FIG. 5 is a block diagram showing a preferred example of the above stated separation filter 12. Referring to FIG. 5, an adder 12A, which is formed by an n-bit adder etc., performs an addition of the first and second signals 110 and 111 provided from the selector 11. A bit shift 12B doubles the display signal from the first dot delay circuit 7. A subtractor 12C receives the output from the adder 12A and the output from the bit shift 12B and calculates the difference between these outputs. A bit shift 12D multiplies, the output from the subtractor by $\frac{1}{4}$.

Now, the operation of the luminance signal and chrominance signal separation filter thus structured will be described. First, description will be given to the operation in case where a series of sampled signal of a NTSC composite color television signal is applied.

Figure 6:
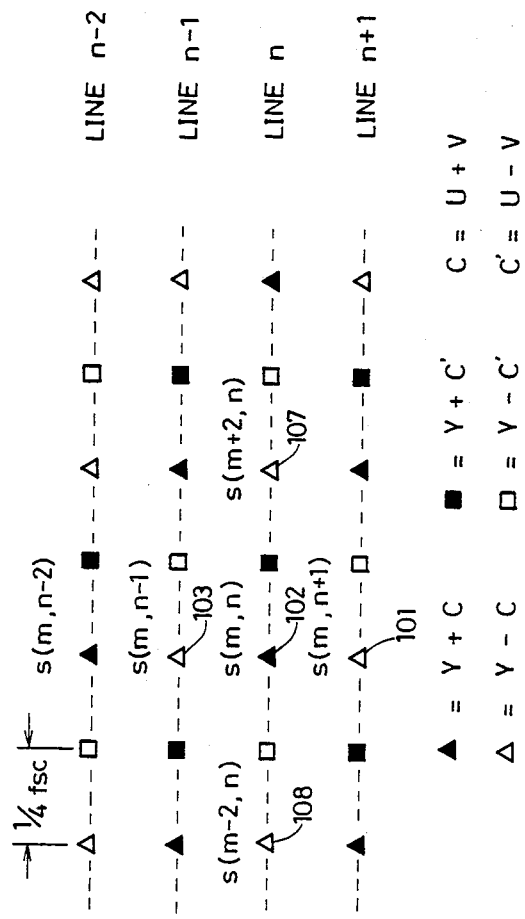
FIG. 6 is an illustration showing an arrangement of a series of sample signal on the screen, in which one field of a NTSC composite color television singal is sampled in synchronism at a frequency four times greater than the chrominance subcarrier frequency.

The first variable line delay circuit 6 receives the series of signal samples 101 of the composite color television signal sampled in synchronism with the chrominance subcarrier at a sampling frequency $f_s = 4f_s$. Now, let us assume that the series of signal sample 101 is a signal $S(m, n+1)$ for representing coordinates $(m, n+1)$ shown in FIG. 6. This signal $S(m, n+1)$ serves as the sampled signal $S(m, n+1)$ at the fourth sampled point. At this time, the sampled signal at the second sampled point which is the output 107 from the first variable line delay circuit 6 is $S(m+2, n)$; the display signal which is the output 102 from the first dot delay circuit 7 is $S(m, n)$; the sampled signal at the first sampled point which is the output 108 from the second dot delay circuit 8 is $S(m-2, n)$; and the sampled signal at the third sampled point which is the output 103 from the second variable line delay circuit 9 is $S(m, n-1)$. These signal samples at the first to fourth sample points are applied to the comparing and determining circuit 10 and to the selector 11. The comparing and determining circuit 10 calculates absolute values of difference $D_1$ to $D_4$ between these signal samples at the first to fourth sample points, in the following manner.

$$D_1 = |S(m-2, n) - S(m, n-1)|$$

$$D_2 = |S(m-2, n) - S(m, n+1)|$$

$$D_3 = |S(m+2, n) - S(m, n-1)|$$

$$D_4 = |S(m+2, n) - S(m, n+1)|$$

Furthermore, the comparing and determing circuit 102 compares these absolute values of difference $D_1$ to $D_4$ and provides a selector control signal 109 indicating the smallest absolute value of difference. On the other hand, the selector 11 selects two sampled signals out of the applied sample signals at the first to fourth sampled points based on the selector control signal 109 from the comparing and determining circuit 10 and provides the selected two signal samples as the first and second signals 110 and 111, i.e. $S_1$ and $S_2$. These first and second signals $S_1$ and $S_2$ are $S(m-2, n)$ and $S(m, n-1)$, respectively, if a combination of $S(m-2, n)$ and $S(m, n-1)$ for example is selected by the comparing and determining circuit 10. Then, the separation filter 12 receives the first and second signals $S_1$ and $S_2$ from the selector 11 and the display signal from the first dot delay circuit 7 and provides as the signal 105, a chrominance signal $C_N(m, n)$ represented by the following equation (9).

$$C_N(m, n) = (-S_1 + 2 \cdot S(m, n) - S_2)/4 \tag{9}$$

On the other hand, the subtractor 5 receives the display signal $S(m, n)$ from the first dot delay circuit 7 and the chrominance signal $C_N(m, n)$ from the separation filter 12 and provides a luminance signal 106 as $Y_N(m, n)$ represented by the following equation (10).

$$Y_N(m, n) = S(m, n) - C_N(m, n) \tag{10}$$

In the luminance signal and chrominance signal separation filter thus structured, four signal samples at the first to fourth sample points adjacent to the specified sampled point (m, n) in the vertical and the horizontal directions on the screen are generated and using sampled signals having little change in the waveform selected out of these four sampled signals, the luminance signal and the chrominance signal are separated. As a result, it is made possible to obtain a color picture where there is little disturbance such as cross color or dot disturbance.

Next, the operation in case of applying a series of signal sample of a PAL composite color television signal will be described.

Figure 7:
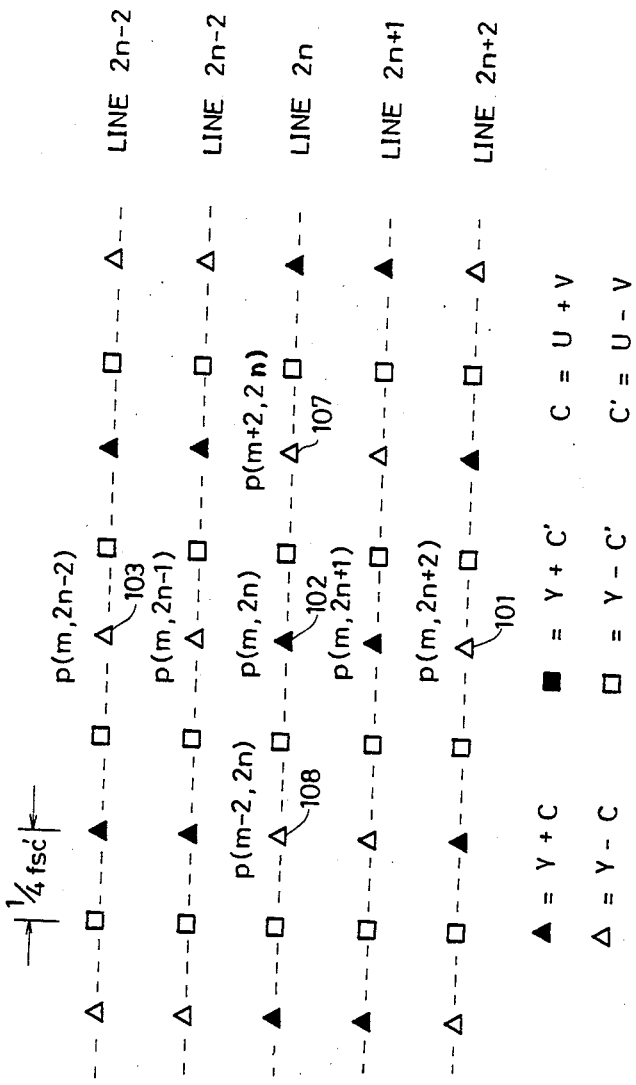
FIG. 7 is an illustration showing an arrangement of a series of sampled signal on the screen, in which one field of a PAL composite color television signal is sampled in synchronism at a frequency four times greater than the chrominance subcarrier frequency.

The first variable line delay circuit 6 receives the series of sampled signal 101 of the composite color television signal sampled in synchronism with the chrominance subcarrier at a sampling frequency $f_s = 4f_{sc}$. It is now assumed that a signal of the series of signal sample 101 is a signal $P(m, 2n+2)$ for representing coordinates (m, 2n+2) shown in FIG. 7. This signal $P(m, 2n+2)$ serves as the signal sample $P(m, 2n+2)$ at the fourth sampled point. At this time, the sampled signal at the second sample point which is the output 107 from the first variable line delay circuit 6 is $P(m+2, 2n)$; the display signal which is the output 102 from the first dot delay circuit 7 is $P(m, 2n)$; the signal sample at the first sample point which is the output 108 from the second dot delay circuit 8 is $P(m-2, 2n)$; and the signal sample at the third sample point which is the output 103 from the second variable line delay circuit 9 is $P(m, 2n-2)$. These signal samples at the first to fourth sample points are applied to the comparing and determining circuit 10 and to the selector 11. The comparing and determining circuit 10 calculates absolute values of difference $E_1$ to $E_4$ between these sample signals at the first to fourth sampled points, in the following manner.

$E_1 = |P(m-2, 2n) - P(m, 2n-2)|$ $E_2 = |P(m-2, 2n) - P(m, 2n+2)|$ $E_3 = |P(m+2, 2n) - P(m, 2n-2)|$ $E_4 = |P(m+2, 2n) - P(m, 2n+2)|$

The comparing and determining circuit 10 compares these absolute values of difference $E_1$ to $E_4$ and provides a selector control signal 109 indicating the smallest absolute value. On the other hand, the selector 11 selects two signal samples out of the received sampled signals at the first to fourth sample points based on the selector signal 109 from the comparing and determining circuit 10 and provides the selected two signal samples as the first and second signals 110 and 111, i.e. $S_{p1}$ and $S_{p2}$. These first and second signals $S_{p1}$ and $S_{p2}$ are $P(m-2, 2n)$ and $P(m, 2n-2)$, respectively, if a combination of $P(m-2, 2n)$ and $P(m-2, 2n-2)$ for example is selected by the comparing and determining circuit 10. Then, the separation filter 12 receives the first and second signals $S_{p1}$ and $S_{p2}$ from the selector 11 and the display signal from the first dot delay circuit 7 and provides at the signal 105, a chrominance signal $C_p(m, 2n)$ represented by the following equation (11).

$$C_p(m, 2n) = (-S_{p1} + 2 \cdot P(m, 2n) - S_{p2})/4 \tag{11}$$

On the other hand, the subtrator 5 receives the display signal $P(m, 2n)$ from the first dot delay circuit 7 and the chrominance signal $C_p(m, n)$ from the separation filter 12 and provides a luminance signal 106 as $Y_p(m, 2n)$ represented by the following equation (12).

$$Y_p(m, 2n) = P(m, 2n) - C_p(m, 2n) \tag{12}$$

In the luminance signal and chrominance signal separation filter thus structured, also in the case of the PAL system, four signal samples at the first to fourth sample points adjacent to the specified sampled point (m, 2n) in the vertical and horizontal directions on the screen are generated and using signal samples having little change in the waveform selected out of these four sampled signals, the luminance signal and the chrominance signal are separated. As a result, it is made possible to obtain a color picture in which cross color disturbance or dot disturbance hardly occurs.

Although in the above described embodiment, comparison is made with respect to the four absolute values of difference $|S(m-2, n) - S(m, n-1)|$, $|S(m-2, n) - S(m, n+1)|$, $|S(m+2, n) - S(m, n-1)|$ and $|S(m+2, n) - S(m, n+1)|$ (in the NTSC SYSTEM), further two absolute values of difference: $S(m-2, n) - S(m+2, n)$ and $S(m, n-1) - S(m, n+1)$ may be calculated, that is, comparison may be made with respect to these six absolute values of difference.

Figure 8:
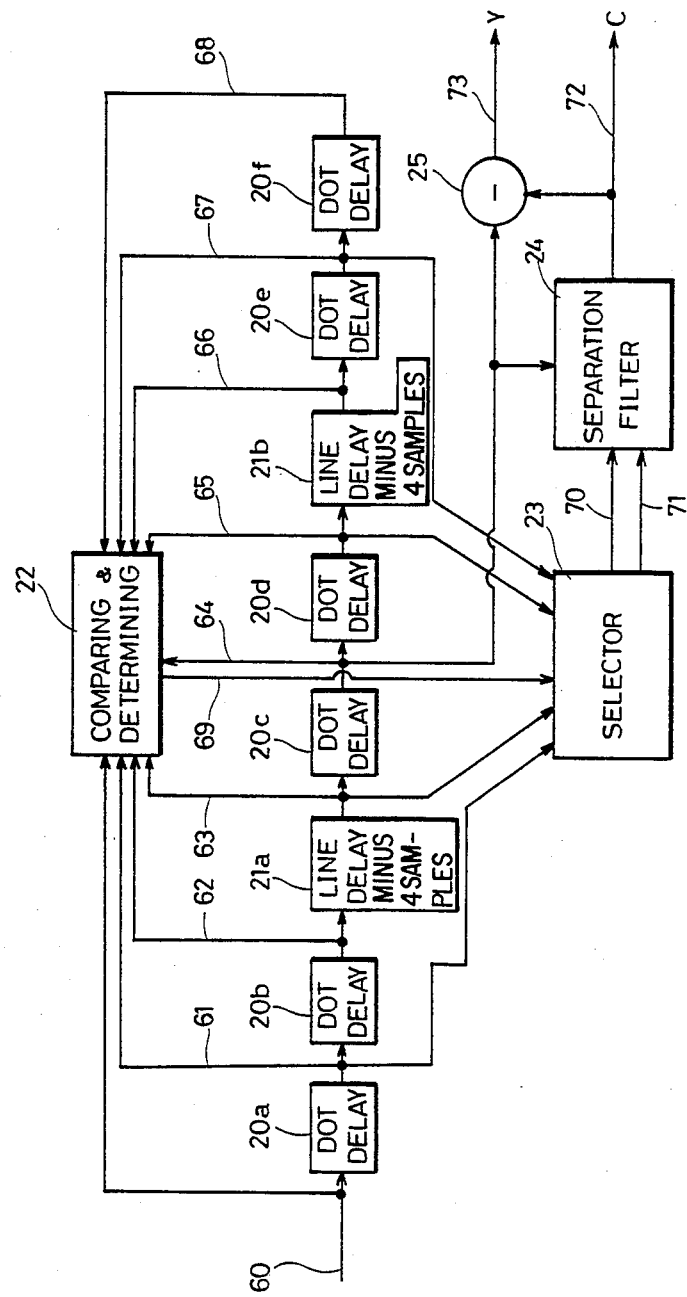
FIG. 8 is a schematic block diagram showing another embodiment of the present invention.

FIG. 8 is a schematic block diagram showing another embodiment of the present invention. Referring to FIG. 8, sampled signal generating means comprises six dot delay circuits 20a to 20f and two line delay circuits 21a and 21b. The respective dot delay circuits 20a to 20f are structured to delay the signals applied thereto by a period of time corresponding to two samples, while the line delay circuits 21a and 21b are structured to delay the signals applied thereto by a period of time corresponding to one line minus four samples. These dot delay circuits and line delay circuits are formed by shift registers for example, in the same manner as in the case of FIG. 2. Though not shown, the apparatus of this embodiment comprises a sampling pulse generating circuit for generating sampling pulses of a frequency four times the chrominance subcarrier frequency and an analog-to-digital converter for converting the received analog composite color television signal to a digital signal using the above stated sampling pulses. The analog-to-digital converter provides a series of signal sample 60 of the NTSC composite color television signal sampled in synchronism with the chrominance subcarrier at a frequency four times the frequency of the chrominance subcarrier and the series of sampled signal 60 is supplied to the dot delay circuit 20a in the first stage of the above stated sampled signal generating means. The sampled signal generating means receives the series of signal sample 60 and generates simultaneously nine sampled signals 60 to 68. The sampled signal 64 is a sampled signal at a specified sample point at which a luminance signal and a chrominance signal are to be separated and the other sampled signals 60 to 63 and 65 to 68 are sample signals at sampled points adjacent to the specified sample point. These sampled signals 60 to 68 are supplied to the comparing and determining circuit 22. The comparing and determining circuit 22 calculates absolute values of difference of predetermined groups of sampled signals selected among theses sampled signals 60 to 68 and provides a selector control signal 69 according to the sampled signals indicating the smallest absolute value of difference. In this embodiment, comparison and determination are made with respect to six absolute values of difference in all, namely, an absolute value of the difference between the sampled signals 65 to 63 at the sample points adjacent to the specified sampled point in the horizontal direction, an absolute value of the difference between the sampled signals 67 and 61 at the sample points adjacent to the specified sample point in the vertical direction and absolute values of the differences between the respective sampled signals 68, 60, 66 and 62 at the sample points diagonally adjacent to the specified sampled point. The above stated selector control signal 69 is supplied to the selector 23. To the selector 23, the sampled signal 61 from the dot delay circuit 20a, the sampled signal 63 from the line delay circuit 21a, the sampled signal 65 from the dot delay circuit 20d and the sampled signal 67 from the dot delay circuit 20e are supplied. Based on the selector control signal 69, the selector 23 selects two sampled signals out of the above stated four sampled signals 61, 63, 65 and 67 and provides the selected two sampled signals as the sampled signals 70 and 71. The sampled signals 70 and 71 provided from the selector 23 are supplied to the separation filter 24. To the separation filter 24, the sample signal 64 at the specified sampled point is also supplied from the dot delay circuit 20c. The separation filter 24 separates a chrominance signal 72 from the sample signal 64 at the specified sampled point using the sampled signals 70 and 71. The separated chrominance signal 72 is supplied to one input of the subtractor 25. To the other input of the subtractor 25, the sampled signal 64 at the specified sample point is supplied from the dot delay circuit 20c. The subtractor 25 subtracts the chrominance signal 72 from the sampled signal 64 to provide a luminance signal 73.

Now, the operation of the embodiment shown in FIG. 8 will be described in the following.

Figure 9:
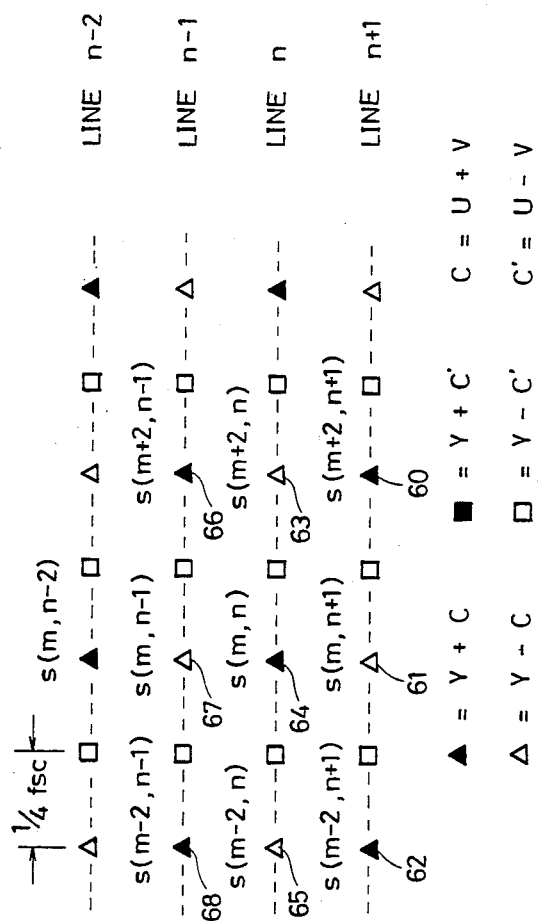
FIG. 9 is an illustration showing an arrangement of a series of signal sample on the screen, in which one field of a NTSC composite color television signal is sampled in synchronism at a frequency four times the chrominance subcarrier frequency, and particularly.

The dot delay circuit 20a receives the series of sampled signal 60 of the NTSC composite color television signal sampled in synchronism with the chrominance subcarrier at a sampling frequency $f_s = 4 \cdot f_{sc}$. The series of sampled signal 60 is arranged two-dimensionally on the screen as shown in FIG. 9. Although the arrangement in FIG. 9 is the same as that in FIG. 6 described previously, FIG. 9 is given particularly for the purpose of clarifying the relations between the respective sampled sinals 60 to 68 in the FIG. 8 embodiment and the respective sampled points on the screen.

Now, assuming that a signal of the series of sampled signal 60 is a sample signal S(m+2, n+1) at a sampled point of coordinates (m+2, n+1) shown in FIG. 9, the sampled signal 64 provided from the dot delay circuit 20c is the sampled signal S(m, n) at the specified sampled point for separating a luminance signal and a chrominance signal. At this time, the sampled signal 61 provided from the dot delay circuit 20a is a sampled signal S(m, n+1) at a sample point vertically adjacent to the specified sampled point and positioned on the lower side thereof; the sampled signal 62 provided from the dot delay circuit 20b is a sample signal S(m−2, n+1) at a sampled point diagonally adjacent to the specified sample point and positioned on the left lower side thereof; the sampled signal 63 provided from the line delay circuit 21a is a sample signal S(m+2, n) at a sampled point horizontally adjacent to the specified sample point and positioned on the right side thereof; the sampled signal 65 provided from the dot delay circuit 20b is a sampled signal S(m−2, n) at a sample point horizontally adjacent to the specified sample point and positioned on the left side thereof; the sampled signal 66 provided from the line delay circuit 21b is a sampled signal S(m+2, n−1) at a sample point diagonally adjacent to the specified sample point and positioned on the right upper side thereof; the sampled signal 67 provided from the dot delay circuit 20e is a sample signal S(m, n−1) at a sampled point vertically adjacent to the specified sample point and positioned on the upper side thereof; and the sampled signal 68 provided from the dot delay circuit 20f is a sample signal S(m−2, n−1) at a sampled point diagonally adjacent to the specified sample point and positioned on the left upper side thereof.

These sampled signals 60 to 68 are supplied to the comparing and determining circuit 22. In the comparing and determining circuit 22, absolute values of difference $F_1$ to $F_6$ are calculated in the following manner.

$$F_1 = |S(m, n-1) - S(m, n+1)|$$

$$F_2 = |S(m-2, n) - S(m+2, n)|$$

$$F_3 = |S(m, n) - S(m-2, n-1)|$$

$$F_4 = |S(m, n) - S(m+2, n-1)|$$

$$F_5 = |S(m, n) - S(m-2, n+1)|$$

$$F_6 = |S(m, n) - S(m+2, n+1)|$$

In these calculations, the smaller is an absolute value of difference, the smaller is a waveform change between two sample points. In the comparing and determining circuit 22, the above indicated absolute values of difference $F_1$ to $F_6$ are compared so that a selector control signal 69 indicating the smallest value out of the values $F_1$ to $F_6$ is provided from the comparing and determining circuit 22. Then, the selector 23 receives the selector control signal 69 and provides sampled signals 70 and 71 for making calculation for separation. These outputs of the selector 23 are selected in the following manner. In case where $F_1$ is the smallest value:

$S(m, n-1)$ and $S(m, n+1)$

In case where $F_2$ is the smallest value $S(m-2, n)$ and $S(m+2, n)$

In case where $F_3$ is the smallest value $S(m-2, n)$ and $S(m, n-1)$

In case where $F_4$ is the smallest value $S(m+2, n)$ and $S(m, n-1)$

In case where $F_5$ is the smallest value $S(m-2, n)$ and $S(m, n+1)$

In case where $F_6$ is the smallest value $S(m+2, n)$ and $S(m, n+1)$

These sampled signals 70 and 71 for separation are supplied to the separation filter 24. The separation filter 24 calculates and provides a separated chrominance signal $C_N$ by the below indicated equation (13), using the sampled signals 70 and 71 for separation and the sampled signal 64 as $S(m, n)$.

$$C_N = (2 \cdot S(m, n) - BP1 - BP2)/4 \quad (13)$$

where BP1 and BP2 represent sampled signals 70 and 71 for separation.

The separated chrominance signal $C_N$ 72 provided from the separation filter 24 is subtracted from the composite color television signal $S(m, n)$ at the specified sample point by means of the subtractor 25 so that a separated luminance signal Y 73 represented by the following equation (14) is obtained.

$$Y = S(m, n) - C_N \quad (14)$$

In the above described embodiment, changes in the waveform of the composite signal in the six directions are examined and the separation filter is structured by using the sample point in the direction where the change in the waveform is smallest. Consequently, the luminance signal and the chrominance signal can be separated accurately even in a region where there are considerable changes in the luminance and the chrominance of the picture and a color picture can be reproduced without cross color or dot disturbance.

Although in the above described embodiment, a separated chrominance sign $C_N$ is subtracted from the composited color television signal $S(m, n)$ so as to obtain the separated luminance signal Y, the separated luminance signal can also be obtained by making the separation filter adapted in the following manner.

$$Y = (2 \cdot S(m, n) + BP1 + BP2)/4$$

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A luminance signal and chrominance signal separation filter for separating a luminance signal and a chrominance signal from a composite color television signal, comprising:

input means for entering a series of of signal samples of a composite color television signal sampled in synchronism with a chrominance subcarrier at a frequency of four times the chrominance subcarrier, said series of signal samples entered from said input means being displayed on the screen at positions which are arranged on the screen in a two-dimensional lattice, said filter further comprising:

generating means for generating further signals based on the series of signal samples entered from said input means, said further signals including a signal at a specified point at which a luminance signal and a chrominance signal are to be separated, and signals at four or more sample points nearby to said specified point on said screen, the phase of the chrominance subcarrier thereof being the same as that of said signal at said specified point or different therefrom by 180°, determining means for determining a difference between signals at elements of each of a plurality of groups of neighboring sample points and for determining which group has the smallest difference, based on the further signals provided from said generating means, a selector for receiving said signal samples at said four or more sample points provided from said generating means and selecting and providing signal samples at two sample points belonging to the group with the smaller absolute value of difference, based on the determination by said determining means, a separation filter for separating a chrominance signal of said signal at said specified point using said two signal samples provided from said selector, and calculating means for subtracting the chrominance signal separated by said separation filter from said sampled signal by said specified sampled point so as to provide a luminance signal, wherein said generating means generates as said further signals at said four or more sample points nearby to said specified point, signal samples at four sample points vertically and horizontally adjacent to said specified point, namely, positioned on the upper, lower, right and left sides of said specified point, the phase of the chrominance subcarrier of said signal samples being different from that of said signal at said specified point by 180°, and said determining means comprises:

absolute value of difference calculating means for calculating at least four absolute values of difference between the signal samples at the four sample points, namely, the upper, lower, right and left sample points provided from said generating means, and comparing means for comparing said at least four absolute values of difference to detect the smallest value.

2. A luminance signal and chrominance signal separation filter in accordance with claim 1, wherein a series of signal samples of a composite color television signal of NTSC system is entered from said input means, and said generating means comprises:
- output means for outputting said series of signal samples entered from said input means in an unchanged form,
- first line delay means for delaying the output of said output means by a period of time corresponding to one line minus two sample points on said screen,
- first dot delay means for delaying an output of said first line delay means by a period of time corresponding to two sample points,
- second dot delay means for delaying an output of said first dot delay means by a period of time corresponding to two sample points, and
- second line delay means for delaying an output of said second dot delay means by a period of time corresponding to one line minus two sample points on said screen.

3. A luminance signal and chrominance signal separation filter in accordance with claim 1, wherein
said absolute value of difference calculating means comprises:
- first absolute value of difference calculating means for calculating an absolute value of difference between the signal sample at a sample point nearby to said specified point in the horizontal direction and positioned on the left side thereof and the signal sample at a sample point nearby to said specified point in the vertical direction and positioned on the upper side thereof,
- second absolute value of difference calculating means for calculating an absolute value of difference between the signal sample at a sample point nearby to said specified point in the horizontal direction and positioned on the left side thereof and the signal sample at a sample point nearby to said specified point in the vertical direction and positioned on the lower side thereof,
- third absolute value of difference calculating means for calculating an absolute value of difference between the signal sample at a sample point nearby to said specified point in the horizontal direction and positioned on the right side thereof and the signal sample at a sample point nearby to said specified point in the vertical direction and positioned on the upper side thereof, and
- fourth absolute value of difference calculating means for calculating an absolute value of difference between the signal sample at a sample point nearby to said specified point in the horizontal direction and positioned on the right side thereof and the signal sample at a sample point nearby to said specified point in the vertical direction and positioned on the lower side thereof.

4. A luminance signal and chrominance signal separation filter in accordance with claim 3, wherein
said selector selects and provides signal samples at two sample points applied to the corresponding absolute value of difference calculating means, when said comparing means detects the smallest of the outputs of said first to fourth absolute value of difference calculating means.

5. A luminance signal and chrominance signal separation filter for separating a luminance signal and a chrominance signal from a composite color television signal, comprising:
input means for entering a series of signal samples of a composite color television signal sampled in synchronism with a chrominance subcarrier at a frequency of four times the chrominance subcarrier,
said series of signal samples entered from said input means being displayed on the screen at positions which are arrangned on the screen in a two-dimensional lattice,
said filter further comprising:
generating means for generating further signals based on the series of signal samples entered from said input means, said further signals including a signal at a specified point at which a luminance signal and a chrominance signal are to be separated, and signals at four or mroe sample points nearby to said specified point on said screen, the phase of the chrominance subcarrier thereof being the same as that of said signal at said specified point of different therefrom by 180°,
determining means for determining a difference between signals at elements of each of a plurality of groups of neighboring sample points and for determining which group has the smallest difference, based on the further signals provided from said generating means,
a selector for receiving said signal samples at said four or more sample points provided from said generating means and selecting and providing signal samples at two sample points belonging to the group with the smaller absolute value of difference, based on the determination by said determining means,
a separation filter for separating a chrominance signal of said signal at said specified point using said two signal samples provided from said selector, and
calculating means for subtracting the chrominance signal separated by said separation filter from said sampled signal at said specified sampled point so as to provide a luminance signal, wherein
said generating means generates as said further signals at said four or more sample points nearby to said specified point, signal samples at four sample points vertically and horizontally adjacent to said specified point, namely, positioned on the upper, lower, right and left sides of said specified point, the phase of the chrominance subcarrier of said signal samples being different from that of said signal at said specified point by 180°, wherein
a series of signal samples of a composite color television signal of the PAL system is entered from said input means, and
said generating means comprises:
- output means for outputting said series of signal samples entered from said input means in an unchanged form,
- first line delay means for delaying the output of said output means by a period of time corresponding to two lines minus two sample points on said screen,
- first dot delay means for delaying an output of said first line delay means by a period of time corresponding of two sample points,
- second dot delay means for delaying an output of said first dot delay means by a period of time corresponding to two sample points, and
- second line delay means for delaying an output of said second dot delay means by a period of time corresponding to two lines minus two sample points on said screen.

6. A luminance signal and chrominance signal separation filter for separating a luminance signal and a chrominance signal from a composite color television signal, comprising:
input means for entering a series of signal samples of a composite color television signal sampled in synchronism with a chrominance subcarrier at a frequency of four times the chrominance subcarrier,
said series of signal samples entered from said input means being displayed on the screen at positions which are arranged on the screen in a two-dimensional lattice,
said filter futher comprising:
generating means for generating further signals based on the series of signal samples entered from said input means, said further signals including a signal at a specified point at which a luminance signal and a chrominance signal are to be separated, and signals at four or more sample points nearly to said specified point on said screen, the phase of the chrominance subcarrier thereof being the same as that of said signal at said specified point or different therefrom by 180°,
determining means for determining a difference between signals at elements of each of a plurality of groups of neighboring sample points and for determining wich group has the smallest difference, based on the further signals provided from said generating means,
a selector for receiving said signal samples at said four or more sample points provided from said generating means and selecting and providing signal samples at two sample points belonging to the group with the smaller absolute value of difference, based on the determination by said determining means,
a separation filter for separating a chrominance signal of said signal at said specified point using said two signal samples provided from said selector, and
calculating means for subtracting the chrominance signal separated by said separation filter from said sampled signal at said specified sampled point so as to provide a luminance signal, wherein
said generating means generates as said further signals at said four or more sample points nearby to said specified point, signal samples at four sample points vertically and horizontally adjacent to said specified point, namely, positioned on the upper, lower, right and left sides of said specified point, the phase of the chrominance subcarrier of said signal samples being different from that of said signal at said specified point by 180°, wherein
a series of signal samples of a composite color television signal of the NTSC or PAL system is entered from said input means, and
said generating means comprises:
output means for outputting said series of signal samples entered from said input means in an unchanged form,
first variable line delay means for delaying the output of said output means by a period of time corresponding to one line minus two sample points on said screen or by a period of time corresponding to two lines minus two sample points on said screen, dependent on whether the series of signal samples of the composite color television signal entered from said input means is of the NTSC system or of the PAL system,
first dot delay means for delaying an output of said first variable line delay means by a period of time corresponding to two sample points,
second dot delay means for delaying an output of said first dot delay means by a period of time corresponding to two sample points, and
second variable line delay means for delaying an output of said second dot delay means by a period of time corresponding to one line minus two sample points on said screen or by a period of time corresponding to two lines minus two sampled points on said screen, dependent on whether the series of signal samples of the composite color television signal entered from said input means is of the NTSC system or of the PAL system.

7. A luminance signal and chrominance signal separation filter for separating a luminance signal and a chrominance signal from a composite color television signal, comprising:
input means for entering a series of signal samples of a composite color television signal sampled in synchronism with a chrominance subcarrier at a frequency of four times the chrominance subcarrier,
said series of signal samples entered from said input means being displayed on the screen at positions which are arranged on the screen in a two-dimensional lattice,
said filter further comprising:
generating means for generating further signals based on the series of signal samples entered from said input means, said further signals including a signal at a specified point at which a luminance signal and a chrominance signal are to be separated, and signals at four or more sample points nearby to said specified point on said screen, the phase of the chrominance subcarrier thereof being the same as that of said signal at said specified point or different therefrom by 180°,
determining means for determining a difference between signals at elements of each of a plurality of groups of neighboring sample points and for determining which group has the smallest difference, based on the further signals provided from said generating means,
a selector for receiving said signal samples at said four or more sample points provided from said generating means and selecting and providing signal samples at two sample points belonging to the group with the smaller absolute value of difference, based on the determination by said determining means,
a separation filter for separating a chrominance signal of said signal at said specified point using said two signal samples provided from said selector, and
calculating means for subtrating the chrominance signal separated by said separation filter from said sampled signal at said specified sampled point so as to provide a luminance signal, wherein
a series of signal samples of a composite color television signal of the NTSC system is entered from said input means,
said generating means generates as the further signals at said four or more sample points nearby to said specified point, signal samples at eight sample points in all, namely signal samples at four sample points vertically and horizontally nearby to said specified point, positioned on the upper and lower sides and the right and left sides thereof, the chrominance subcarrier of said signal samples at said four sample points having a phase diffrent from that of said signal at said specified point by 180°, and signal samples at four samples points diagonally nearby to said specified point, positioned on the left upper and lower sides and the right upper and lower sides thereof, the chrominance subcarrier of said signal samples at said four diagonally nearby sample points having the same phase as that of said signal at said specified point, and said selector selects, among the signal samples at the four sample points vertically and horizontally nearby to said specified point provided from said generating means, signal samples at two sample points belonging to a region where there is little change in a picture, based on the determination by said determining means and provides said selected signal samples at said two sample points.

8. A luminance signal and chrominance signal separation filter in accordance with claim 7, wherein said generating means comprises:

output means for outputting the series of signal samples entered from said input means in an unchanged form, first dot delay means for delaying the output of said output means by a period of time corresponding to two sample points, second dot delay means for delaying an output of said first dot delay means by a period of time corresponding to two sample points, first line delay means for delaying an output of said second dot delay means by a period of time corresponding to one line minus four sample points on said screen, third dot delay means for delaying an output of said first line delay means by a period of time corresponding to two sample points, fourth dot delay means for delaying an output of said third dot delay means by a period of time corresponding to two sample points, second line delay means for delaying an output of said fourth dot delay means by a period of time corresponding to one line minus four sample points on said screen, fifth dot delay means for delaying an output of said second line delay means by a period of time corresponding to two sample points, and sixth dot delay means for delaying an output of said fifth dot delay means by a period of time corresponding to two sample points.

9. A luminance signal and chrominance signal separation filter in accordance with claim 7, wherein said determining means comprises:

absolute value of difference calculating means for caloulating at least six absolute values of difference including differences between the signal samples at the specified point and the eight signal samples nearby thereto provided from said generating means, and comparing means for comparing said at least six absolute values of difference to detect the smallest value.

10. A luminance signal and chrominance signal separation filter in accordance with claim 9, wherein said absolute value of difference calculating means comprises:

first absolute value of difference calculating means for calculating an absolute value of difference between a signal sample at a sample point vertically nearby to said specified point and positioned on the upper side thereof and a signal sample at a point vertically nearby to said specified sampled point and positioned on the lower side thereof, second absolute value of difference calculating means for calculating an absolute value of difference between a signal sample at a sample point horizontally nearby to said specified point and positioned on the left side thereof and a signal samples at a point horizontally nearby to said specified sampled point and positioned on the right side thereof, third absolute value of difference calculating means for calculating an absolute value of difference between said signal at said specified point and the sample signal at a sample point diagonally nearby to said specified point and positioned on the left upper side thereof, fourth absolute value of difference calculating means for calculating an absolute value of difference between said signal at said specified point and the sample signal at a sample point diagonally nearby to said specified point and positioned on the right upper side thereof, fifth absolute value of difference calculating means for calculating an absolute value of difference between said signal at said specified point and the sample signal at a sampled point diagonally nearby to said specified point and positioned on the left lower side thereof, and sixth absolute value of difference calculating means for calculating an absolute value of difference between said signal at said specified point and the sample signal at a sampled point diagonally nearby to said specified point and positioned on the right lower side thereof.

11. A luminance signal and chrominance signal separation filter in accordance with claim 10, wherein said selector selects and outputs: the signal samples at the sample points on the upper and lower sides vertically nearby to said specified point, based on a determination by said comparing means that the output of said first absolute value of difference calculating means is the smallest;

the signal samples at the sample points on the right and left sides horizontally nearby to said specified point, based on a determination by said comparing means that the output of said second absolute value of difference calculating means is the smallest;

the signal sample at the sample point on the upper side vertically nearby to said specified point and the signal sample at the sample point on the left side horizontally nearby to said specified point, based on a determination by said comparing means that the output of said third absolute value of difference calculating means is the smallest;

the signal sample at the sample point on the upper side vertically nearby to said specified point and the signal sample at the sample point on the right side horizontally nearby to said specified point, based on a determination by said comparing means that the output of said fourth absolute value of difference calculating means is the smallest;

the signal sample at the sample point on the lower side vertically nearby to said specified point and the signal sample at the sample point on the left side horizontally nearby to said specified point, based on a determination by said comparing means that the output of said fifth absolute value of difference calculating means is the smallest; and the signal sample at the sample point on the lower side vertically nearby to said specified point and the signal sample at the sample point on the right side horizontally nearby to said specified point, based on a determination by said comparing means that the output of said sixth absolute value of difference calculating means is the smallest.

* * * * *

UNITED STATES PATENT AND TRADEMARK OFFICE
CERTIFICATE OF CORRECTION

PATENT NO. : 4,727,415

DATED : February 23, 1988

INVENTOR(S) : Nakagawa et al

It is certified that error appears in the above-identified patent and that said Letters Patent is hereby corrected as shown below:

ON THE TITLE PAGE:
Under [30] Foreign Application Priority Data,

Japanese reference 57-210010 should read 59-210010;
57-271168 should read 59-271168

Signed and Sealed this

Fourteenth Day of February, 1989

Attest:

DONALD J. QUIGG

*Attesting Officer*    *Commissioner of Patents and Trademarks*